(12) United States Patent
Jadidian et al.

(10) Patent No.: US 12,228,051 B1
(45) Date of Patent: Feb. 18, 2025

(54) COMPONENTS HAVING COATING SYSTEMS COMPRISING MUD CRACKS AND METHODS FOR FORMING THE COATING SYSTEMS

(71) Applicant: HONEYWELL INTERNATIONAL INC., Charlotte, NC (US)

(72) Inventors: Bahram Jadidian, Morris Plains, NJ (US); Kevin Blinn, Morris Plains, NJ (US); Mehrad Mehr, Morris Plains, NJ (US)

(73) Assignee: HONEYEWELL INTERNATIONAL INC., Charlotte, NC (US)

( * ) Notice: Subject to any disclaimer, the term of this patent is extended or adjusted under 35 U.S.C. 154(b) by 43 days.

(21) Appl. No.: 18/359,480

(22) Filed: Jul. 26, 2023

(51) Int. Cl.
| F01D 5/28 | (2006.01) |
| C04B 35/16 | (2006.01) |
| C04B 35/584 | (2006.01) |
| C04B 41/52 | (2006.01) |
| C04B 41/87 | (2006.01) |
| C04B 41/91 | (2006.01) |

(52) U.S. Cl.
CPC .............. *F01D 5/288* (2013.01); *C04B 35/16* (2013.01); *C04B 35/584* (2013.01); *C04B 41/524* (2013.01); *C04B 41/87* (2013.01); *C04B 41/91* (2013.01); *C04B 2235/3427* (2013.01); *C04B 2235/3873* (2013.01); *C04B 2235/945* (2013.01); *F05D 2230/22* (2013.01); *F05D 2230/90* (2013.01)

(58) Field of Classification Search
CPC ....... F01D 5/288; C04B 35/16; C04B 35/584; C04B 41/524; C04B 41/87; C04B 41/91; C04B 2235/3427; C04B 2235/3873; C04B 2235/945; F05D 2230/22; F05D 2230/90
See application file for complete search history.

(56) References Cited

U.S. PATENT DOCUMENTS

| 5,558,922 | A | 9/1996 | Gupta et al. |
| 7,291,403 | B2 | 11/2007 | Nagaraj et al. |
| 8,357,454 | B2 | 1/2013 | Kulkarni et al. |
| 11,156,106 | B2 | 10/2021 | Schaeffer et al. |
| 11,866,377 | B2 * | 1/2024 | Mehr ................ C04B 37/003 |

(Continued)

FOREIGN PATENT DOCUMENTS

EP 2044235 B1 5/2020

*Primary Examiner* — Hoang M Nguyen
(74) *Attorney, Agent, or Firm* — Lorenz & Kopf LLP (57) ABSTRACT

Components having coating systems that include mud cracks, methods for forming the coating systems, and vehicles including the components are provided. The components include a substrate having silicon nitride and a coating system on a surface of the substrate. The coating system includes a first layer of a first coating material on the substrate, wherein the first coating material includes a rare earth silicate and has a first thickness measured in a direction perpendicular to the surface of the substrate, and a second layer of a second coating material on the first layer, wherein the second coating material includes a rare earth silicate and has a second thickness that is greater than the first thickness. The second layer includes mud cracks that extend from an exterior surface thereof toward the substrate, and the mud cracks have widths in a range of about 50 to 200 micrometers.

20 Claims, 5 Drawing Sheets

(56) References Cited

U.S. PATENT DOCUMENTS

| | | | |
|---|---|---|---|
| 2015/0159507 A1* | 6/2015 | Sivaramakrishnan | F01D 5/288 428/596 |
| 2017/0216969 A1 | 8/2017 | Dietrich et al. | |
| 2018/0305821 A1* | 10/2018 | Wan | C23D 5/005 |
| 2024/0165661 A1* | 5/2024 | Mehr | C04B 41/009 |

* cited by examiner

COMPONENTS HAVING COATING SYSTEMS COMPRISING MUD CRACKS AND METHODS FOR FORMING THE COATING SYSTEMS

STATEMENT REGARDING FEDERALLY SPONSORED RESEARCH OR DEVELOPMENT

This invention was made with Government support under 693KA9-21-T-0004 awarded by the Federal Aviation Administration. The Government has certain rights in this invention.

TECHNICAL FIELD

The present invention generally relates to coating systems, and more particularly relates to components and methods for coating the components to produce coating systems thereon that include mud cracks.

BACKGROUND

The aircraft industry's overall goal of hotter engine temperatures necessitates the use of advanced ceramics like silicon nitride and SiC/SiC composites in engine components such as shrouds. Despite the ability of such ceramics to withstand high temperatures, they require environmental barrier coatings (EBC) to survive water vapor in the combustion environment. In addition, the drive for even higher operating temperatures may require thermal barrier coatings (TBC) to enhance silicon-based ceramic component survivability.

One method of forming layers of coating systems that include EBCs and TBCs is by direct sintering. However, direct sintering of the layers, particularly disilicate-based layers disposed on silicon nitride substrates, may result in formation of patterns of mud cracks (i.e., mud flat cracks) in one or more of the layers, that is, cracks extending from an exterior surface of the coating system toward the underlying substrate. When such cracking occurs, the mud cracks are typically filled. Generally, the mud cracks are filled either by adding a subsequent layer or by applying a fill coat slurry on the sintered, cracked layer and re-firing. However, these filling processes may not produce a defect free coating system. Instead, these processes may result in remnant cavities at the bottom of the cracks (i.e., portions of the cracks closest to the substrate). These cavities define relatively large voids that act as crack initiation points potentially leading to lower substrate strength of the final components.

Hence, there is a need for systems and methods for producing coating systems that address the issues resulting from the formation of mud cracks. Furthermore, other desirable features and characteristics of the present invention will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In various embodiments, a method is provided that includes forming a first layer of a first coating material on a substrate of a component, wherein the first coating material includes a rare earth silicate, the substrate of the component includes silicon nitride, and the first layer has a first thickness, and forming a second layer of a second coating material on the first layer, wherein the second coating material includes a rare earth silicate and the second layer has a second thickness that is greater than the first thickness of the first layer, wherein the second layer is formed in a manner to intentionally cause formation of mud cracks in the second layer that extend from an exterior surface thereof toward the substrate, wherein the second thickness is sufficient to cause the mud cracks to form having widths in a range of about 50 to 200 micrometers.

In various embodiments, a component is provided that includes a substrate having silicon nitride, and a coating system on a surface of the substrate. The coating system includes a first layer of a first coating material on the substrate, wherein the first coating material includes a rare earth silicate and has a first thickness measured in a direction perpendicular to the surface of the substrate, and a second layer of a second coating material on the first layer, wherein the second coating material includes a rare earth silicate and has a second thickness that is greater than the first thickness of the first layer, wherein the second layer includes mud cracks that extend from an exterior surface thereof toward the substrate, wherein the mud cracks have widths in a range of about 50 to 200 micrometers.

In various embodiments, a vehicle is provided that includes a component that includes a substrate having silicon nitride, and a coating system on a surface of the substrate. The coating system includes a first layer of a first coating material on the substrate, wherein the first coating material includes a rare earth silicate and has a first thickness measured in a direction perpendicular to the surface of the substrate, and a second layer of a second coating material on the first layer, wherein the second coating material includes a rare earth silicate and has a second thickness that is greater than the first thickness of the first layer, wherein the second layer includes mud cracks that extend from an exterior surface thereof toward the substrate, wherein the mud cracks have widths in a range of about 75 to 125 micrometers, wherein the second thickness is in a range of 6 to 12 micrometers, wherein the mud cracks have inner surfaces that have a smooth or rounded profile.

Furthermore, other desirable features and characteristics of the method, the component, and the vehicle will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, embodiments of the present disclosure include components that have a coating system bonded to a substrate thereof, and manufacturing methods for providing the components. In various embodiments, the component may be configured for use in a high temperature and/or high pressure environment, and the coating system may be a protective ceramic coating, such as an environmental barrier coating (EBC) and/or a thermal barrier coating (TBC). The coating systems may be capable of providing environmental and thermal protection at high temperatures, such as 2850° F. (about 1565° C.) or greater.

Notably, the components disclosed herein include coating systems having mud cracks in one or more layers thereof. The mud cracks may be unfilled or partially filled. Such mud cracks may promote stress relief within the coating system during use of the component.

In general, the presence of cracks, such as mud cracks, in coating systems may cause stress concentrations that compromise mechanical properties of the coating systems and/or provide paths for gases, liquids, or vapors to penetrate the coating systems and degrade the substrate therebelow. As such, conventional methods for forming coating systems on components, such as components configured for use in high temperature and/or high pressure environments, may preferentially avoid forming cracks in the coating system and/or include processes intended to mitigate formed cracks, such as filling the cracks. In contrast, the methods disclosed herein intentionally cause formation of mud cracks in, for example, the outermost layer of the coating system. Furthermore, the methods disclosed herein include intentionally cause the mud cracks to have widths of 50 μm or more within the cracks, such as at a base or innermost portion of the cracks. Counterintuitively, mud cracks formed in this manner may reduce the likelihood of damage occurring to the coating system and/or component during use of the component relative to components formed using conventional techniques as noted above by providing stress relief without or with reduced stress concentration relative to cracks formed during certain conventional methods.

For example, a coating system formed by a conventional method that includes filling mud cracks may result in the mud cracks being less than entirely filled, that is, resulting in unintended porosity that comprises sharp (i.e., low angle of curvature of crack tip; e.g., 10 μm or less) inner surfaces that define stress concentration points. The relatively large mud cracks formed by the methods disclosed herein may have trapezoidal profiles with the base or innermost end (i.e., a narrow end of the trapezoidal shape) being 50 μm or more in width and/or inner surfaces with relatively smoother or more rounded profiles (i.e., a radius of curvature at the crack tip of greater than about 20 μm) that are less likely to cause stress concentration.

The components are not particularly limited to any size, shape, or application. The components may be used in any industry including, but not limited to, the automobile industry, the aerospace industry, the transportation industry, the power generation industry, the mining industry, etc. The components may be particularly suitable for use in a high temperature and/or high pressure environments including, but not limited to, power plants, mining, petroleum and oil refining, fracking, under water applications, deep sea applications, etc. In various embodiments, the components may be any portion of a vehicle, aircraft, ship, train, etc. In some embodiments, the components may be any portion of an engine or a motor, such as used for propulsion of a vehicle, aircraft, ship, train, etc. In some embodiments, the components may be any portion of a gas turbine engine, such as an aircraft engine. Non-limiting examples of such components include airfoils (e.g., blades and vanes), combustor liners, and shrouds.

Figure 1:
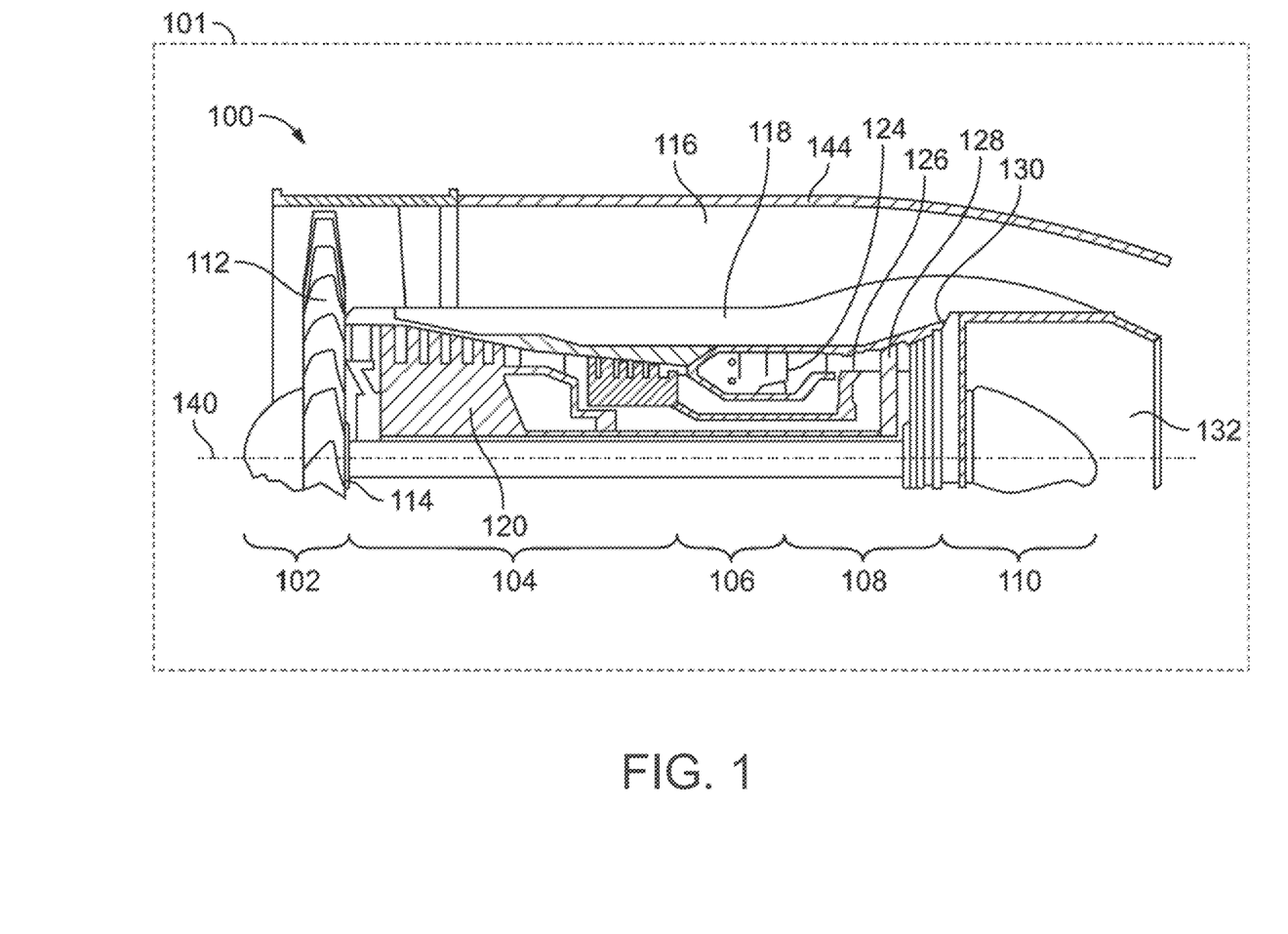
FIG. 1 is a schematic view of a gas turbine engine according to example embodiments of the present disclosure.

With reference to FIG. 1, a partial, cross-sectional view of an exemplary gas turbine engine 100 is shown with the remaining portion of the gas turbine engine 100 being substantially axisymmetric about a longitudinal axis 140, which also defines an axis of rotation for the gas turbine engine 100. In the depicted embodiment, the gas turbine engine 100 is an annular multi-spool turbofan gas turbine jet engine within an aircraft (represented schematically at 101), although features of the present disclosure may be included in other configurations, arrangements, and/or uses. For example, in other embodiments, the gas turbine engine 100 may assume the form of a non-propulsive engine, such as an Auxiliary Power Unit (APU) deployed onboard the aircraft 101, an industrial power generator, or other turbomachine.

In this example, with continued reference to FIG. 1, the gas turbine engine 100 includes a fan section 102, a compressor section 104, a combustor section 106, a turbine section 108, and an exhaust section 110. In one example, the fan section 102 includes a fan 112 mounted on a rotor 114 that draws air into the gas turbine engine 100 and compresses it. A fraction of the compressed air exhausted from the fan 112 is directed through the outer bypass duct 116 and the remaining fraction of air exhausted from the fan 112 is directed into the compressor section 104. The outer bypass duct 116 is generally defined by an outer casing 144 that is spaced apart from and surrounds an inner bypass duct 118.

In the embodiment of FIG. 1, the compressor section 104 includes one or more compressors 120. The number of compressors 120 in the compressor section 104 and the configuration thereof may vary. The one or more compressors 120 sequentially raise the pressure of the air and direct a majority of the high-pressure fluid or air into the combustor section 106. In the combustor section 106, which includes a combustion chamber 124, the high-pressure air is mixed with fuel and is combusted. The high-temperature combustion air or combustive gas flow is directed into the turbine section 108. In this example, the turbine section 108 includes three turbines disposed in axial flow series, namely, a high-pressure turbine 126, an intermediate pressure turbine 128, and a low-pressure turbine 130. However, it will be appreciated that the number of turbines, and/or the configurations thereof, may vary. In this embodiment, the high-temperature combusted air from the combustor section 106 expands through and rotates each turbine 126, 128, and 130. The combustive gas flow then exits the turbine section 108 for mixture with the cooler bypass airflow from the outer bypass duct 116 and is ultimately discharged from the gas turbine engine 100 through the exhaust section 132. As the turbines 126, 128, 130 rotate, each drives equipment in the gas turbine engine 100 via concentrically disposed shafts or spools.

The engine 100 may include at least one component with a coated outer surface. The component may be included in an area of the engine 100 subjected to high-temperature environments. Thus, the component may be included in the combustor section 106, the turbine section 108, etc. In various embodiments, a blade, vane, shroud, combustor liner, or other component of the engine 100 may include the coated outer surface. It will be appreciated that the coated outer surface may be included on a component of something other than a gas turbine engine without departing from the scope of the present disclosure.

The coated outer surface is defined by one or more layers of the coating system secured directly or indirectly (e.g., via underlying layers thereof) to surfaces of a substrate (i.e., an underlying layer or body). The substrate may be defined by a component body. The component body may define a majority of the component. The component body may have a variety of shapes without departing from the scope of the present disclosure.

In various embodiments, the component body and, thus the substrate, may be constructed of a ceramic material. The substrate may include or be a monolithic ceramic or a ceramic matrix composite. A ceramic is an inorganic solid that may include metals, non-metals, or metalloid atoms primarily held together with ionic and/or covalent bonds. Ceramics may be crystalline, semi-crystalline, partially crystalline, or amorphous. The substrate may include ceramic material throughout, such that the substrate is essentially 100 percent ceramic. Alternatively, the substrate may be defined as a substrate that includes a ceramic coating disposed over a non-ceramic (e.g., metallic) core. The substrate is not particularly limited in size, dimensions, etc.

The substrate may be or include any ceramic known in the art. For example, the substrate may be or include silicon nitride, silicon carbide, silicon-carbide-silicon carbide composites, silicon oxynitride, SiAlON materials (materials that include silicon, aluminum, oxygen, and nitrogen), silicon dioxide, and combinations thereof. In other embodiments, the substrate may be or include silicon nitride, silicon carbide, silicon-carbide-silicon carbide composites, or combinations thereof. In various embodiments, the substrate may be or include from about 50 to about 100 weight percent, or from about 80 to about 100 weight percent, or from about 99 to about 100 weight percent of silicon nitride, silicon carbide, silicon oxynitride, SiAlON materials, silicon dioxide, and combinations thereof. In various non-limiting embodiments, all values and ranges of values including and between those set forth above are hereby expressly contemplated for use herein.

The coating system may include a plurality of layers. In various embodiments, the coating system includes an environmental barrier coating (EBC) having one or more layers, and a thermal barrier coating (TBC) having one or more layers. In such embodiments, the EBC may serve as a barrier between the substrate and high temperature air or steam when operating in conditions wherein water vapor becomes a reactive species and causes erosion, and the TBC may have low thermal conductivity for thermally protecting the underlying EBC and the substrate. The EBC and the TBC may each include one or more layers. The EBC may be provided on an underlying surface, such as that of a substrate or another coating thereon, and the TBC may be provided on the EBC.

The EBC and the TBC may be made from a variety of materials without departing from the scope of the present disclosure. In various embodiments, the EBC and/or the TBC may include a rare earth silicate that may be or include at least one rare earth monosilicate (e.g., $RE_2SiO_5$, where RE is a rare earth element), at least one rare earth disilicate (e.g., $RE_2Si_2O_7$, where RE is a rare earth element), or combinations thereof. The rare earth element may include at least one of Lu (lutetium), Yb (ytterbium), Tm (thulium), Er (erbium), Ho (holmium), Dy (dysprosium), Tb (terbium), Gd (gadolinium), Eu (europium), Sm (samarium), Pm (promethium), Nd (neodymium), Pr (praseodymium), Ce (cerium), La (lanthanum), Y (yttrium), or Sc (scandium). In various embodiments, the rare earth silicate is $Y_2SiO_5$, $Gd_2SiO_5$, $Er_2SiO_5$, $Yb_2SiO_5$, $Lu_2SiO_5$, $Y_2Si_2O_7$, $Gd_2Si_2O_7$, $Er_2Si_2O_7$, $Yb_2Si_2O_7$, or $Lu_2Si_2O_7$, or combinations thereof.

In various embodiments, the layers of the coating system may each have a dense microstructure, a columnar microstructure, or a combination of dense and columnar microstructures. A dense microstructure may be more effective in preventing the infiltration of environmental contaminants (e.g., steam), while a columnar microstructure may be more strain tolerant during thermal cycling. In various embodiments, a combination of dense and columnar microstructures may be more effective in preventing the infiltration of environmental contaminants than a fully columnar microstructure while being more strain tolerant during thermal cycling than a fully dense microstructure. In various embodiments, the dense microstructures may have a porosity of between about 5 to 10 percent and the columnar microstructures may have a porosity of about 5 to about 50 percent. In various embodiments, the layers of the coating system have microstructures that transition from dense to columnar. For example, the EBC may have a porosity of about 10 percent, and the TBC may have one or more layers that transition from a porosity of about 20 percent to a porosity of about 50 percent. Preferably, the porosity of the layers of the coating system is closed.

The layers of the coating system are not particularly limited in size, thickness, or other dimensions. In various embodiments, one or more of the layers of the coating system may have a thickness of from about 25 μm to about 1 mm. However, the TBC or another outermost layer may include a thickness that is sufficient to cause formation of mud cracks therein during formation of such layer, wherein the mud cracks have widths of at least 50 μm as discussed in more detail below.

Figure 2:
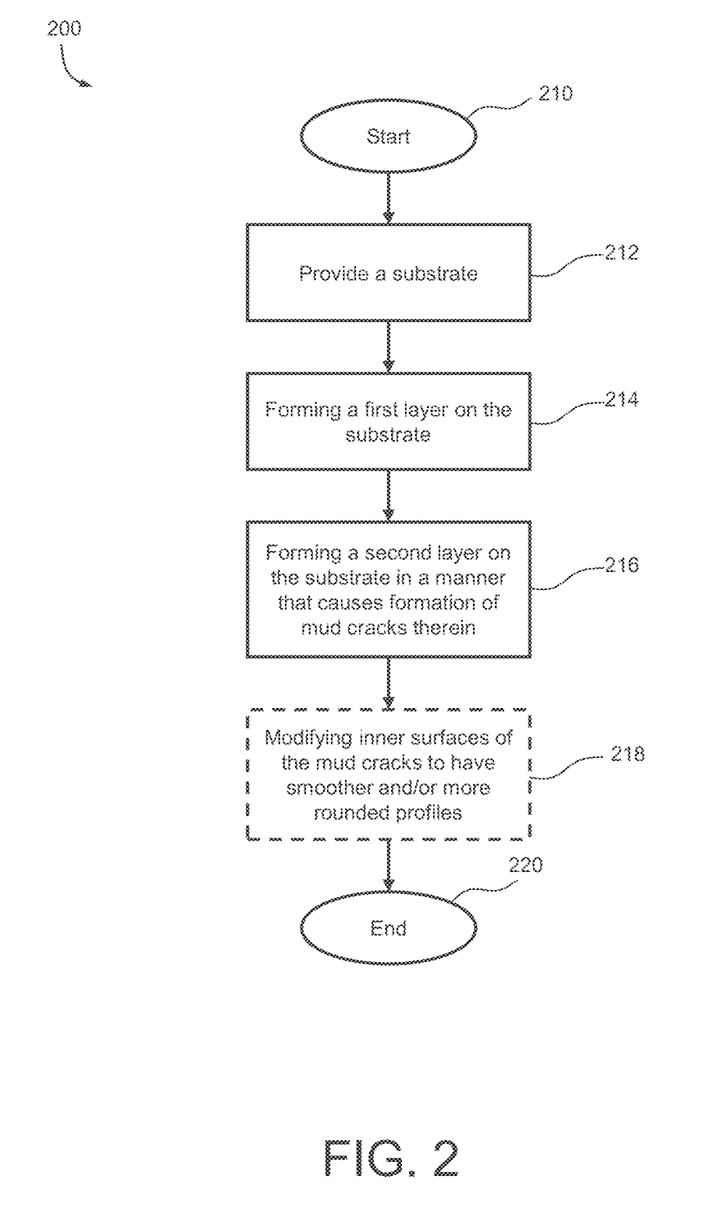
FIG. 2 is a flowchart illustrating certain aspects of a method for producing a coating system on the component according to example embodiments of the present disclosure.

The coating system may be applied onto the surface of the substrate by various processes. For examples, FIG. 2 is a flow chart illustrating an exemplary method 200 for forming the coating system on the substrate of the component. The method 200 may start at 210. At 212, the method 200 may include providing the substrate. The step of providing the substrate may include various processes of manufacturing the substrate (e.g., casting, machining, etc.) and/or preparing the substrate for forming the coating system thereon (e.g., etching, cleaning, etc.).

At 214, the method 200 includes forming a first layer (e.g., the EBC) of the coating system on the substrate. In certain embodiments, the coating system may be applied using a direct sintering process. For example, the coating system may be applied using a spray application, dip application, silkscreen application, blade application, or a combination thereof. Each of the layers of the coating system may be disposed on the substrate as a paint, paste, or slurry, or as an aqueous or non-aqueous solution (collectively referred to herein as precursor compositions). In various embodiments, the precursor composition may include powders of a rare earth disilicate and/or a rare earth monosilicate mixed in a carrier fluid, such as alcohol. In some embodiments, the powders have submicron particle sizes, such as 0.02 to 20 μm.

In some embodiments, the method 200 includes applying and subsequently drying a first precursor composition on the substrate. If the applied first precursor composition includes a binder a debinding process may be performed to remove (e.g., burning off) all or a portion of the binder that is present in the applied first precursor composition. The drying process and the optional debinding process are not particularly limited relative to time, temperature, or pressure and these parameters may be chosen by one of skill in the art.

In various embodiments, the method 200 may include performing a heat treatment and/or HIP process on the substrate and the dried first precursor composition to apply heat and, optionally, pressure thereon. This may cause voids in the applied first precursor composition to collapse under the differential pressure and surfaces of the voids to diffusion bond together to effectively eliminate the defects therebetween. In such embodiments, the heat treatment and/or HIP process may be performed in a furnace, an isostatic press (HIP) furnace, or other heating system having an inert gas (such as helium, neon, argon, krypton, xenon, or nitrogen) environment therein. The heat treatment and/or HIP processes are not particularly limited relative to time, temperature, or pressure and these parameters may be chosen by one of skill in the art.

In various embodiments, the method 200 includes sintering the first precursor composition to densify and/or crystallize the dried first precursor composition and thereby produce the first layer. The sintering process is not particularly limited relative to time, temperature, or pressure and these parameters may be chosen by one of skill in the art.

At 216, the method 200 includes forming a second layer (e.g., the TBC) on the first layer. In various embodiments, the method 200 includes applying a second precursor composition on the first layer. Similar to what was described above for the formation of the first layer, the method 200 may include performing a drying process, an optional debinding and/or heating/HIP processes, and a sintering process on the applied second precursor composition to form the second layer.

The second layer is formed in a manner that promotes the formation of trapezoidally shaped mud cracks therein having crack bottom widths of greater than 50 micrometers, such as in a range of about 50 to 200 micrometers, such as about 75 to 125 micrometers. Formation of the mud cracks and their resulting shapes and sizes may be influenced by the processing parameters (e.g., time, temperature, or pressure) of the drying process, the optional debinding and/or heating/HIP processes, and the conditions of the sintering process, the composition of the second precursor, and the thickness of the applied second precursor composition. In some embodiments, the thickness of the second layer may be in a range of about 6 to 12 micrometers.

At 218, the method 200 may optionally include modifying the inner surfaces of the mud cracks to have smoother and/or more rounded profiles. In some embodiments, the method 200 may include removing material from the inner surfaces of the mud cracks to smooth and/or round the profiles thereof. In some embodiments, the method 200 may include performing an isotropic etching process such as ceramic chemical etching or reactive ion etching on the second layer of the coating system to smooth and/or round the inner surfaces of the mud cracks. In some embodiments, the method 200 may include performing an ion milling process such as focused Ar ion beam on the second layer to smooth and/or round the inner surfaces of the mud cracks.

In some embodiments, the method 200 may include adding material to the inner surfaces of the mud cracks to smooth and/or round the profiles thereof. In some embodiments, the method 200 may include applying and sintering a thin layer of a paste material on the second layer to smooth and/or round the inner surfaces of the mud cracks. In some embodiments, the paste material forms a layer on the inner surfaces of the mud cracks without filling the mud cracks or defining closed porosity therefrom. In some embodiments, the method 200 may include filling the mud cracks with a paste material and sintering the paste material. In some embodiments, the paste material may have a composition solids loading of 15 vol. % or less to produce a thin layer upon sintering having a composition the same as or similar to the second layer. In some embodiments, the paste material may be formed by diluting a paste material used during the formation of the second layer to have a solids loading of 15 vol. % or less.

The method 200 may end at 220.

Figure 3:
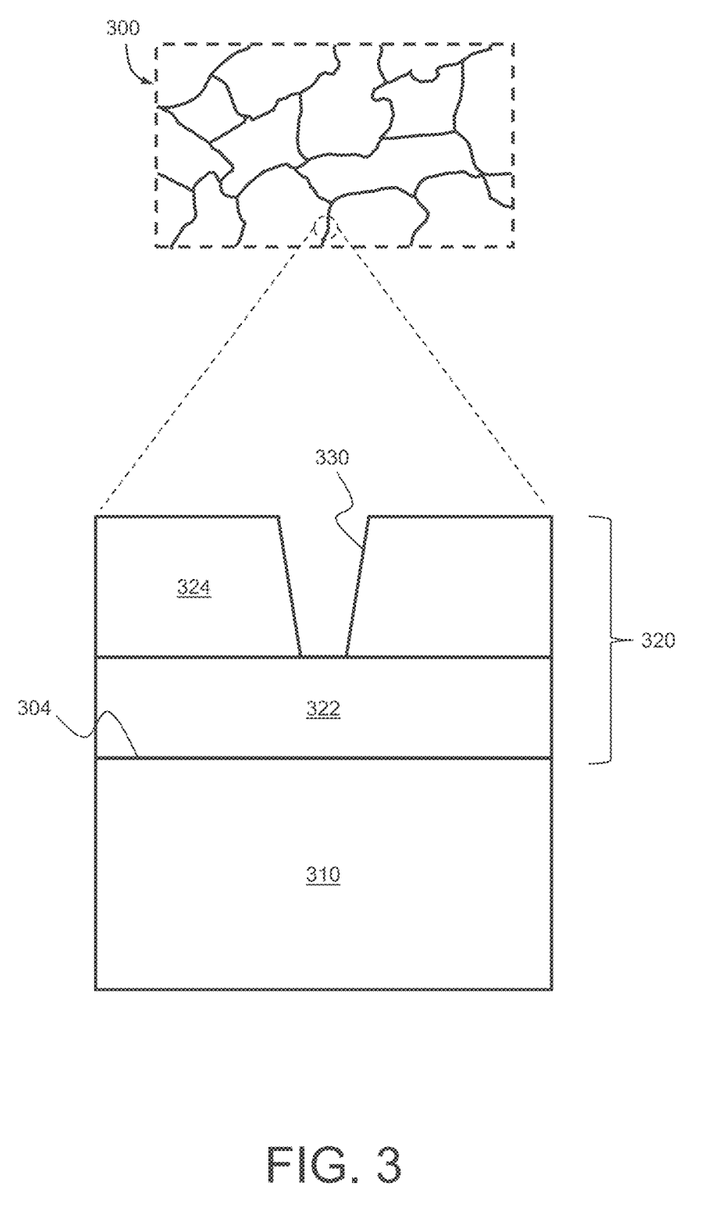
FIG. 3 includes schematic top and cross-sectional views of a coated outer surface of a first component according to example embodiments of the present disclosure.
Figure 4:
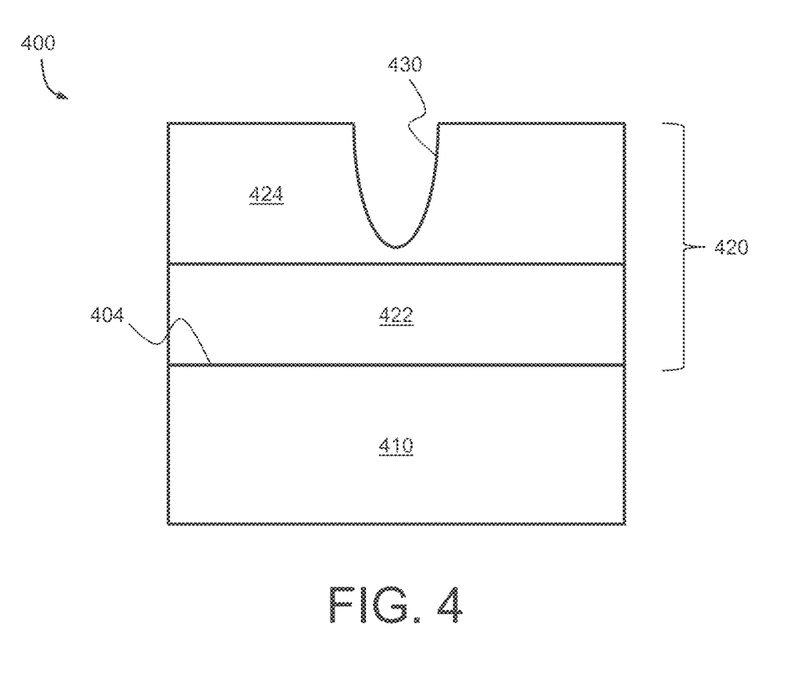
FIG. 4 is a schematic cross-sectional view of a coated outer surface of a second component according to example embodiments of the present disclosure.
Figure 5:
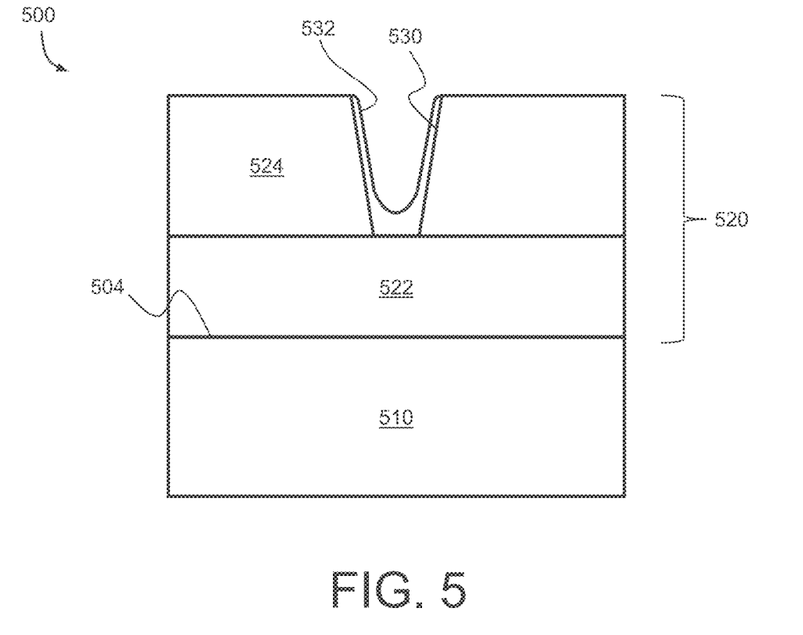
FIG. 5 is a schematic cross-sectional view of a coated outer surface of a third component according to example embodiments of the present disclosure.

FIGS. 3, 4, and 5 present exemplary components 300, 400, and 500 having coating systems 320, 420, and 520 thereon, respectively, in accordance with various aspects described herein. The coating systems 320, 420, and 520 may be formed by the method 200 and have various layer compositions as described above. The components 300, 400, and 500 and the coating systems 320, 420, and 520 thereon, respectively, are merely exemplary and the components, coating systems, and methods disclosed herein are not limited to the examples of FIGS. 3-5.

Referring to FIG. 3, the components 300 includes a coated surface 304 having the coating system 320 formed on a substrate 310 thereof. The coating systems 320 includes an environmental barrier coating (EBC) 322 disposed on the coated outer surface 304. Although represented as a single layer, the EBC 322 may include more than one layer. The EBC 322 may be disposed on and in direct contact with the substrate 310. In other words, there may be no intervening layer disposed between the EBC 322 and the substrate 310. For example, there may be no oxide layer and/or silica layer disposed between the EBC 322 and the substrate 310. Alternatively, the EBC 322 may be deposited on another coating on the substrate 310, such as but not limited to a bond coat. The coating system 320 includes a thermal barrier coating (TBC) 324 disposed on a surface of the EBC 322. Although represented as a single layer, the TBC 324 may include more than one layer. The TBC 324 may be disposed on and in direct contact with the EBC 322, or may be disposed on an intervening layer disposed between the EBC 322 and the TBC 324.

The TBC 324 includes a plurality of mud cracks 330 formed therein during formation of the TBC 324. In this example, the mud cracks 330 do not form in and do not extend into the EBC 322, that is, the EBC 322 is substantially free of the mud cracks 330. In this example, the mud cracks 330 define recesses having a substantially quadrilateral shaped cross-section, wherein the innermost face (i.e., closest to the EBC 322) defines angles with sidewalls of the mud crack 330 that are greater than ninety degrees.

Referring to FIG. 4, the component 400 includes a coated surface 404 having the coating system 420 formed on a substrate 410 thereof. The coating system 420 includes an EBC 422 on the substrate 410 and a TBC 424 on the EBC 422. The TBC 424 includes a plurality of mud cracks 430 formed therein during formation of the TBC 424. In this example, a material removal process (e.g., etching or ion milling) was performed to smooth and/or round the inner surfaces of the mud cracks 430. As a result, the modified mud cracks 430 define recesses having a substantially semioval shaped cross-section.

Referring to FIG. 5, the component 500 includes a coated surface 504 having the coating system 520 formed on a substrate 510 thereof. The coating system 520 includes an EBC 522 on the substrate 510 and a TBC 524 on the EBC 522. The TBC 524 includes a plurality of mud cracks 530 formed therein during formation of the TBC 524. In this example, a material addition process was performed to smooth and/or round the inner surfaces of the mud cracks 530. Specifically, a thin layer of a paste material was applied, dried, and sintered on the second layer to form a third layer 532 within the mud cracks 530 to smooth and/or round the inner surfaces thereof. As a result, the modified inner surfaces of the mud cracks 530, that is, the exposed surfaces of the third layer 532, define recesses having a substantially semioval shaped cross-section or a rounded triangular shaped cross-section.

Figure 6:
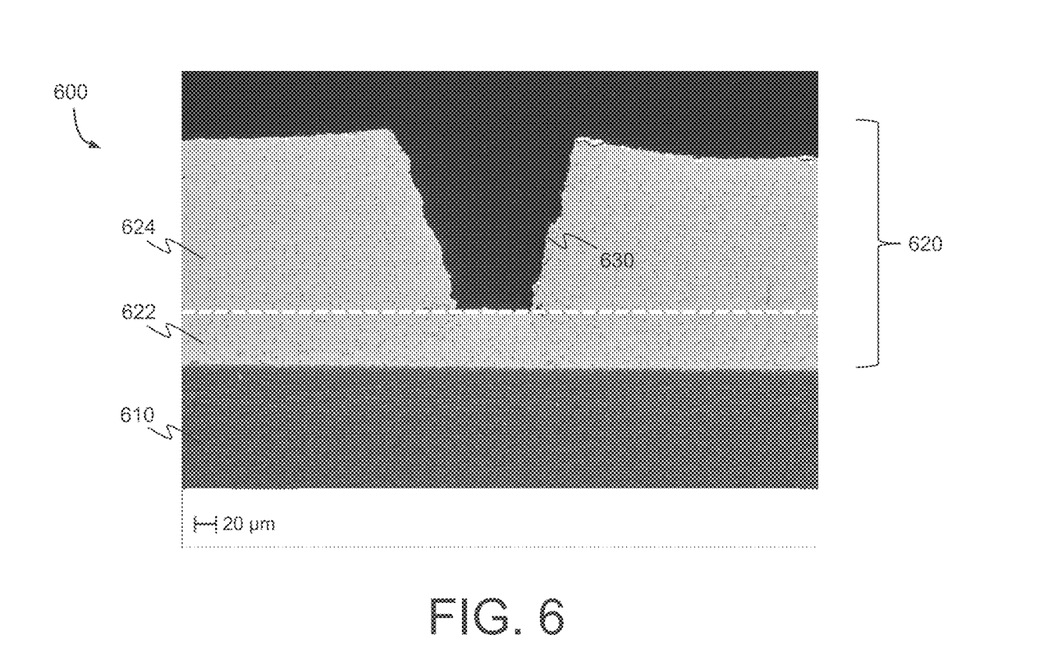
FIGS. 6 and 7 includes images that show cross-sectional views of coated outer surfaces of first and second sample components according to example embodiments of the present disclosure.
Figure 7:
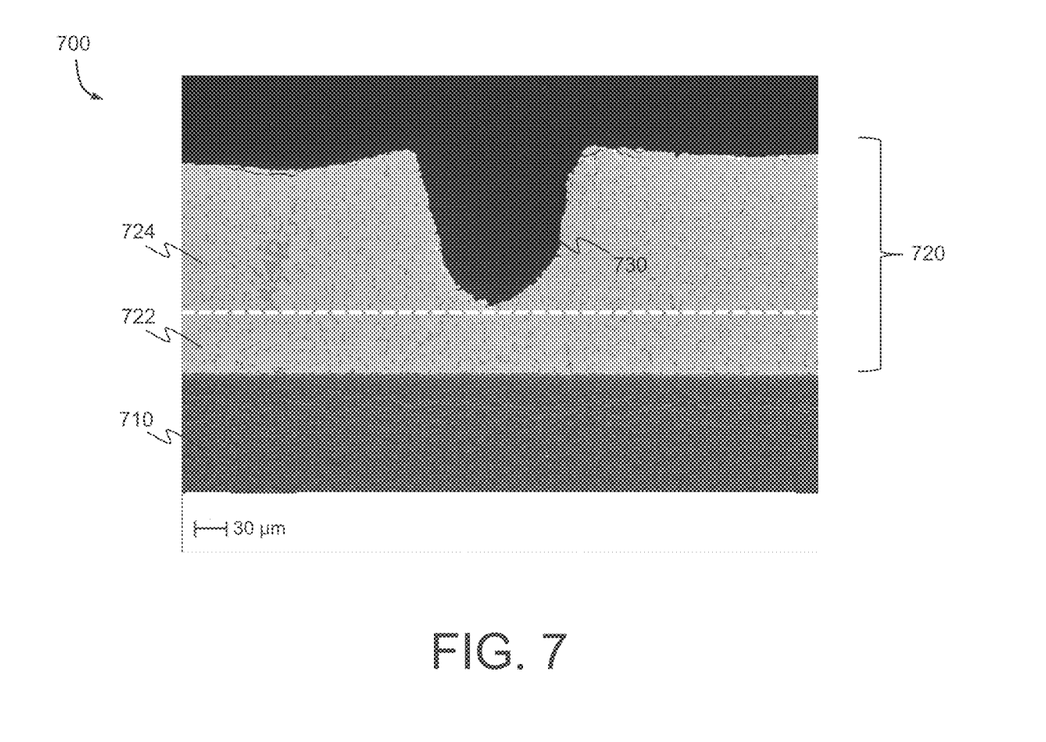

Referring now to FIGS. 6 and 7, images are presented that show cross-sectional views of exemplary sample components 600 and 700 having coating systems 620 and 720 thereon, respectively, that were produced during experimental investigations in accordance with certain aspects disclosed herein.

Referring initially to FIG. 6, the coating system 620 includes a first layer 622 formed on a substrate 610 of the sample component 600, and a second layer 624 formed on the first layer 622. A cross-sectional view of a mud crack 630 is shown that formed in the second layer 624 during formation of the second layer 624. Notably, the mud crack 630 is relatively wide (e.g., greater than 50 µm). Further, the mud crack 630 does not include a sharp inner surface. Instead, the mud crack 630 defines a substantially quadrilateral shaped recess. In this example, the mud crack 630 is limited to the second layer 624 and does not extend into the first layer 622 (boundary of layers represented by a dashed line for clarity).

Referring now to FIG. 7, the coating system 720 includes a first layer 722 formed on a substrate 710 of the sample component 700, and a second layer 724 formed on the first layer 722. A cross-sectional view of a mud crack 730 is shown that initially formed in the second layer 724 during formation of the second layer 724, and subsequently had the inner surfaces thereof modified to include a smoother and/or more rounded profile. The mud crack 730 is relatively wide (e.g., greater than 50 µm) and defines a substantially semioval shaped recess. The mud crack 730 is limited to the second layer 724 and does not extend into the first layer 722 (boundary of layers represented by a dashed line for clarity).

The systems and methods disclosed herein provide various benefits over certain existing systems and methods. For example, conventional methods for forming coating systems on components that preferentially avoid forming cracks in the coating system may be limited in layer thickness, materials, formation processes used, etc. Conventional methods for forming coating systems on components that include filling the cracks may result in unintended porosity with relatively sharp inner surfaces that may function as stress concentration points. The systems and methods disclosed herein provide coating systems that include mud cracks that have inner surfaces that are relatively smooth and/or rounded. As such, the systems and methods may be less restricted and may provide more robust coating systems than conventional methods and system such as those noted above. As such, the systems and methods disclosed herein effectuate an improvement in the technical field of coating systems.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method, comprising:
   forming a first layer of a first coating material on a substrate of a component, wherein the first coating material includes a rare earth silicate, the substrate of the component includes silicon nitride, and the first layer has a first thickness; and
   forming a second layer of a second coating material on the first layer, wherein the second coating material includes a rare earth silicate and the second layer has a second thickness that is greater than the first thickness of the first layer, wherein the second layer is formed in a manner to intentionally cause formation of mud cracks in the second layer that extend from an exterior surface thereof toward the substrate, wherein the second thickness is sufficient to cause the mud cracks to form having widths in a range of about 50 to 200 micrometers.

2. The method of claim 1, wherein the mud cracks have widths in a range of 75 to 125 micrometers.

3. The method of claim 1, wherein the first layer and the second layer are formed by a direct bonding/sintering process.

4. The method of claim 1, wherein the first layer is formed by applying a first paste comprising the first coating material to the substrate, drying the first paste, and then sintering the first paste to form the first layer, and the second layer is formed by applying a second paste comprising the second coating material to the first layer, drying the second paste, and then sintering the second paste to form the second layer.

5. The method of claim 1, wherein the second thickness is in a range of 6 to 12 micrometers.

6. The method of claim 1, wherein the first layer is substantially free of the mud cracks.

7. The method of claim 1, further comprising performing an isotropic etching process or an ion milling process on the second layer to smooth and/or rounded inner surfaces of the mud cracks.

8. The method of claim 1, further comprising applying and sintering a thin layer of a paste material on the second layer to smooth and/or rounded inner surfaces of the mud cracks without filling the mud cracks.

9. The method of claim 1, wherein the component is configured to be installed in a gas turbine engine.

10. The method of claim 9, wherein the component is configured to be installed in the gas turbine engine with the mud cracks remaining unfilled.

11. A component comprising:
a substrate comprising silicon nitride; and
a coating system on a surface of the substrate, wherein the coating system includes:
a first layer of a first coating material on the substrate, wherein the first coating material includes a rare earth silicate and has a first thickness measured in a direction perpendicular to the surface of the substrate; and
a second layer of a second coating material on the first layer, wherein the second coating material includes a rare earth silicate and has a second thickness that is greater than the first thickness of the first layer, wherein the second layer includes mud cracks that extend from an exterior surface thereof toward the substrate, wherein the mud cracks have widths in a range of about 50 to 200 micrometers.

12. The component of claim 11, wherein the mud cracks have widths in a range of 75 to 125 micrometers.

13. The component of claim 11, wherein the second thickness is in a range of 6 to 12 micrometers.

14. The component of claim 11, wherein the first layer is substantially free of the mud cracks.

15. The component of claim 11, wherein the mud cracks have inner surfaces that have a smooth or rounded profile.

16. The component of claim 11, further comprising a third layer of a third coating material on the second layer that has a third thickness that is less than the first thickness and the second thickness, wherein the third layer defines smooth and/or rounded inner surfaces of the mud cracks without filling the mud cracks.

17. The component of claim 11, wherein the component is configured to be installed in a gas turbine engine.

18. The component of claim 17, wherein the component is configured to be installed in the gas turbine engine with the mud cracks remaining unfilled.

19. A vehicle comprising a component that includes:
a substrate comprising silicon nitride; and
a coating system on a surface of the substrate, wherein the coating system includes:
a first layer of a first coating material on the substrate, wherein the first coating material includes a rare earth silicate and has a first thickness measured in a direction perpendicular to the surface of the substrate; and
a second layer of a second coating material on the first layer, wherein the second coating material includes a rare earth silicate and has a second thickness that is greater than the first thickness of the first layer, wherein the second layer includes mud cracks that extend from an exterior surface thereof toward the substrate, wherein the mud cracks have widths in a range of about 75 to 125 micrometers, wherein the second thickness is in a range of 6 to 12 micrometers, wherein the mud cracks have inner surfaces that have a smooth or rounded profile.

20. The vehicle of claim 19, wherein the coating system of the component includes a third layer of a third coating material on the second layer that has a third thickness that is less than the first thickness and the second thickness, wherein the third layer defines the smooth and/or rounded inner surfaces of the mud cracks without filling the mud cracks.

* * * * *